United States Patent [19]
Nagai et al.

[11] 3,983,575
[45] Sept. 28, 1976

[54] COLOR SATURATION AND CONTRAST CONTROL CIRCUITRY RESPONSIVE TO AMBIENT LIGHT

[75] Inventors: Kunio Nagai, Tokyo; Tooru Akutagawa, Chiba, both of Japan

[73] Assignee: Sony Corporation, Tokyo, Japan

[22] Filed: May 12, 1975

[21] Appl. No.: 576,892

[30] Foreign Application Priority Data
May 20, 1974 Japan.......................... 49-57266[U]

[52] U.S. Cl. ............................ 358/27; 178/7.5 DC; 358/39
[51] Int. Cl.² ..................... H04N 9/535; H04N 5/58
[58] Field of Search................ 178/7.3 DC, 7.5 DC; 358/21, 27, 29, 39, 40

[56] References Cited
UNITED STATES PATENTS
3,813,686  5/1974  Mierzwinski........................... 358/27
3,814,852  6/1974  Mierzwinski................... 178/7.5 DC Primary Examiner—Robert L. Richardson
Attorney, Agent, or Firm—Lewis H. Eslinger; Alvin Sinderbrand

[57] ABSTRACT

A control circuit used in a color television receiver for controlling a reproduced picture in response to an ambient light level has a photo-sensitive device, a transistor whose base electrode is connected to the photo-sensitive device, a variable resistor connected in series to the transistor, a voltage controlled contrast control circuit and a voltage controlled color saturation control circuit both controlled by a control voltage obtained at a movable contact of said variable resistor, and a switch connected in parallel to the transistor which is adapted to be manually closed.

8 Claims, 2 Drawing Figures

COLOR SATURATION AND CONTRAST CONTROL CIRCUITRY RESPONSIVE TO AMBIENT LIGHT

BACKGROUND OF THE INVENTION

1. Field of the Invention

This invention relates generally to a television receiver control circuit and more particularly to an automatic control circuit for maintaining proper balance between room lighting conditions and the brightness of a reproduced picture.

2. Description of the Prior Art

It is known to use a photo-sensitive device to control the brightness, contrast and color saturation of the reproduced picture of a color television receiver in response to the ambient light level. However, in a conventional television receiver, complex circuits are needed to control the brightness, contrast and color saturation simultaneously, and it is difficult to provide a variable resistor serving both for manual control and fine control in an automatic control condition.

SUMMARY OF THE INVENTION

An improved automatic reproduced picture control circuit according to the present invention overcomes the disadvantages inherent to the prior art circuit mentioned above in a novel and simple manner.

According to the present invention, voltage controlled circuits are used as a brightness control circuit, a contrast control circuit and a color saturation control circuit. A resistance of which is varied in response to the ambient light level, is connected to a transistor, and a variable resistor having a movable contact also is connected to the transistor to derive a common control voltage for the contrast control circuit and the color saturation control circuit. By using the teaching of this invention, contrast and color saturation of the reproduced picture of the color television receiver can be well controlled by a simple circuit construction, and further a manual fine control can be achieved even in an automatic control condition.

It is an object of this invention to provide an improved automatic reproduced picture control circuit for a television receiver.

Another object of this invention is to provide an automatic picture control circuit for a color television receiver using a voltage controlled contrast control circuit and a voltage controlled color saturation control circuit.

Still another object of this invention is to provide an automatic picture control circuit in which a manual fine control can be achieved even in an automatic control condition.

Further another object of this invention is to provide an automatic picture control circuit which will function properly regardless of the condition of the variable control resistor.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
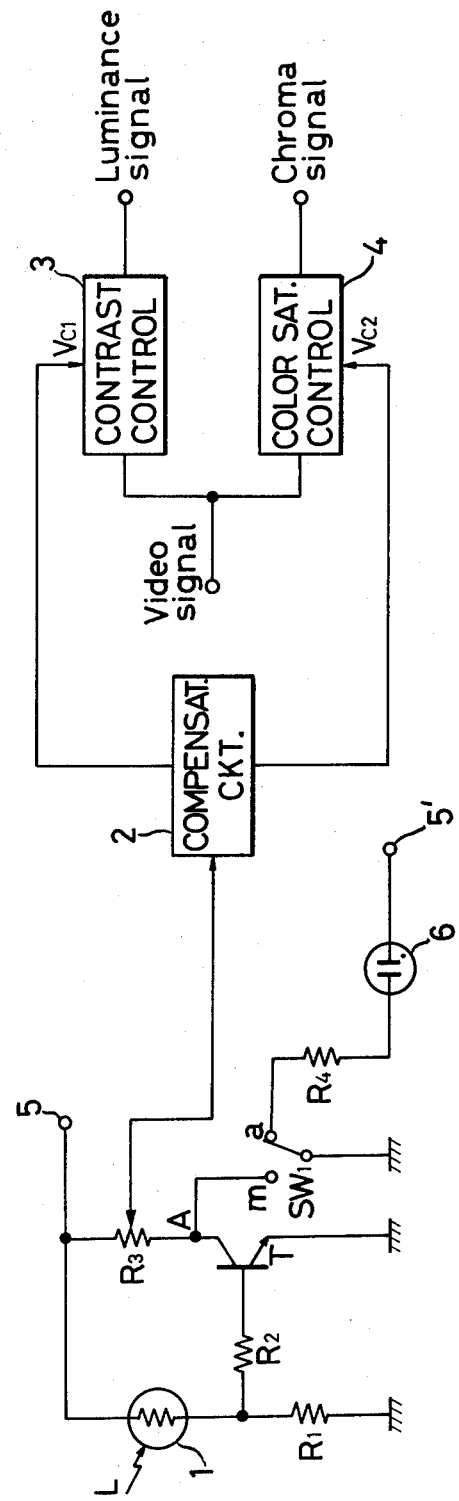
FIG. 1 is a partial block diagram of an automatic control circuit used for explaining a principle of this invention.

In FIG. 1, a reference numeral 1 represents a photo-sensitive element such as a CdS photo cell, $R_1$ and $R_2$ represent bias resistors, T a transistor operable as a variable impedance, and $R_3$ a variable resistor for controlling a reproduced picture of a television receiver. A reference numeral 2 represents a compensating circuit for providing a predetermined compensation in the relationship between a control voltage $Vc_1$ for a contrast control circuit 3 and a control voltage $Vc_2$ for a color saturation control circuit. Reference numerals 5 and 5' represent power supply terminals, and $SW_1$ switch having contacts a and m for selecting an automatic control mode or a manual control mode. Reference numeral 6 represents a Neon lamp for indicating an automatic control mode, $R_4$ a current limiting resistor for the Neon lamp 6, and L ambient light. The contrast control circuit 3 and the color saturation control circuit 4, such as a bandpass amplifier in a chroma amplifier, are voltage-controlled amplifiers each of whose gain increases when the control voltage applied thereto decreases.

Further, a luminance signal amplifier (not shown) including the contrast control circuit 3 is of the pedestal-clamped type, so that brightness control is equivalently accomplished by controlling the gain of the contrast control circuit 3.

The resistance of the CdS photo cell 1 varies with the level of the ambient light L. A voltage variable with the resistance of the CdS photo cell 1 is applied to the base electrode of the transistor T through the resistor $R_2$. Accordingly, the collector voltage at point A can vary from zero voltage to the power supply voltage, when the switch $SW_1$ is closed at the contact a. The variable DC voltage at the point A is applied to the compensating circuit 2 through the variable resistor $R_3$. DC control voltages $Vc_1$ and $Vc_2$ are obtained in a suitable ratio by dividing resistors which may constitute the compensating circuit 2. The DC control voltage $Vc_1$ is applied to the contrast control circuit 3 to control the gain of the control circuit 3. With this gain control, the contrast of the reproduced picture and equivalently the brightness thereof can be adjusted. The DC control voltage $Vc_2$ is applied to the color saturation control circuit 4 which may be a band-pass amplifier to control the gain of the band-pass amplifier. With this gain control, the color saturation of the reproduced picture can be adjusted.

When the level of the ambient light L becomes higher, the voltage at the point A is lowered to increase the contrast of the reproduced picture and the color saturation thereof. An indicating lamp 6 is lit in the above-mentioned condition, which indicates that the control circuit is in an automatic control mode.

When the switch $SW_1$ is closed at the contact m, the point A is connected to ground, and the control circuit is in a manual control mode. The reproduced picture can be manually controlled with the variable resistor $R_3$.

Users of color television receivers, who rely on different automatic control circuits or devices, are generally apt to be unacquainted with the different manual controls, such as control knobs. The users often do not manipulate the manual control knobs. Accordingly, the manual control knobs are often left alone and are not properly operated to adjust the reproduced video picture. A brightness control knob and a knob for the variable resistor $R_3$ are associated with the automatic reproduced picture control circuit shown in FIG. 1, as manual control knobs. However, there are the following considerations for such manual control knobs.

When the level of the ambient light, and therefore the brightness of the reproduced picture, are higher for the automatic control condition of the control circuit, the usual Automatic Beam Limitter (ABL) is normally more sensitive. By adjusting the brightness control knob, the cut-off level of the cathode ray tube can be controlled so as to coincide with the pedestal level of the reproduced picture. However, the cut-off level can be varied because of the nature of the particular television transmitters and/or receiver or as a choice of the users. Even when the brightness control variable resistor is set at a position for maximum brightness, a nearly normally reproduced picture can be obtained with the ABL when the level of the ambient light is not so low. The brightness of the reproduced picture automatically decreases as the level of the ambient light is lowered. However, if the variable resistor for the brightness control is not adjusted and remains set at the position for maximum brightness, the brightness of the reproduced picture cannot sufficiently decrease when the level of the ambient light becomes low, so that the overall reproduced picture appears whitish.

The variable resistor $R_3$ of FIG. 1 is arranged to perform an automatic control operation at maximum sensitivity to ambient light when its movable contact is at one end of the variable resistor $R_3$ nearer to the point A. When the movable contact is at the other end of the variable resistor $R_3$, opposite to the point A, the voltage obtained at the movable contact in the automatic control condition is fixed to the power supply voltage, and so the control voltage cannot vary with the level of the ambient light.

As above mentioned, the well reproduced picture cannot be obtained in the automatic reproduced picture control circuit when the brightness control knob and the knob for the variable resistor $R_3$ are set at erroneous positions.

Figure 2:
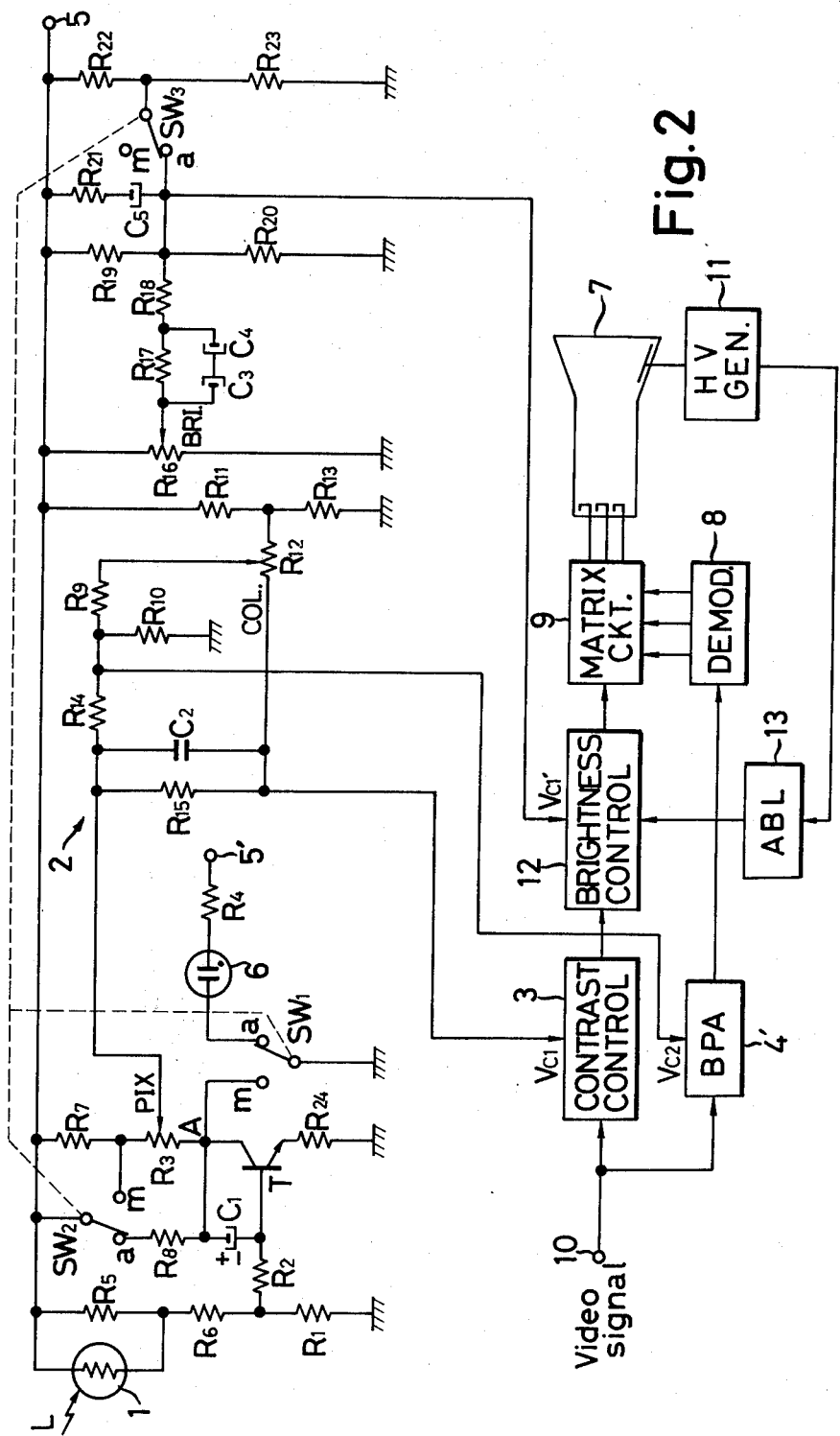
FIG. 2 is a detailed schematic diagram of an automatic picture control circuit of this invention.

An automatic reproduced picture control circuit shown in FIG. 2 overcomes these disadvantages.

Elements in FIG. 2 which correspond with the elements in FIG. 1 are identified by the same reference numerals.

A resistor $R_6$ is connected to control the sensitivity of the CdS photo cell 1. A resistor $R_7$ is connected to the variable resistor $R_3$ in series. A switch $SW_2$ having contacts $a$ and $m$ is ganged with the switch $SW_1$. When the switch $SW_2$ is closed at the contact $a$, a resistor $R_8$ is connected in parallel to the series-connected resistors $R_3$ and $R_7$. $R_{24}$ represents an emitter grounding resistor for the transistor T. As an example, when the maximum resistance of the variable resistor $R_3$ is 5KΩ, the resistances of the resistors $R_7$ and $R_8$ are determined as 10KΩ and 6.8KΩ, respectively.

A capacitor $C_1$ is connected between the base electrode of the transistor T and the collector electrode thereof. A time constant determined by the capacitor $C_1$ and the resistor $R_2$ functions to prevent the control circuit from responding to any rapid change in the level of the ambient light, for example, when a person passes by the color television receiver. In this case, the Miller effect of the transistor T is utilized. Accordingly, a predetermined time constant can be obtained with the capacitor $C_1$ having a relatively small capacitance. When the switch $SW_1$ is closed at the contact $m$, the terminal of the capacitor $C_1$ connected to the collector electrode of the transistor T is connected to the ground. When the switch $SW_1$ is closed at the contact $a$, the DC voltage applied to the collector-connected terminal of the capacitor $C_1$ is higher than the DC voltage applied to the base-connected terminal of the capacitor $C_1$. If the DC voltage applied to the collector-connected terminal of the capacitor $C_1$ is lower than the DC voltage applied to the base-connected terminal of the capacitor $C_1$ when the switch $SW_1$ is closed at the contact $m$, the capacitor $C_1$ should be non-polar. However, since the base-collector junction of the NPN-type transistor T is a PN junction diode biased in the forward direction, the base voltage of the transistor T hardly increases when the switch $SW_1$ is closed at the contact $m$. Hence, even if the capacitor $C_1$ is uni-polar, it will not be damaged by the reverse voltage. Thus, an inexpensive uni-polar capacitor $C_1$ can be used in the Miller circuit having the switch $SW_1$ by which the collector electrode of the transistor T is connected to the ground.

In FIG. 2, a reference numeral 7 represents a cathode ray tube, 8 a demodulator, 9 a matrix circuit, 10 a composite color television signal input terminal, and 12 a voltage controlled brightness control circuit. A high voltage generator 11 includes a flyback transformer and a rectifier. A signal proportional to the beam current is obtained from the high voltage generator 11 in the well known manner, which is applied to an Automatic Beam Limitter (ABL) 13.

Resistors $R_9$, $R_{10}$ ... and $R_{15}$, and capacitor $C_2$ constitute one embodiment of the compensating circuit 2 of FIG. 1. The variable DC voltage at the point A is applied through the variable resistor $R_3$ to the compensating circuit 2 from which the control voltages $Vc_1$ and $Vc_2$ are obtained in the predetermined ratio. In the compensating circuit 2, a voltage obtained at the variable resistor $R_{12}$ is divided by the resistors $R_9$ and $R_{10}$ to obtain the control voltage $Vc_2$. The control voltage $Vc_2$ is applied to the band-pass amplifier 4'. The control voltage $Vc_1$ is obtained through the resistors $R_{14}$ and $R_{15}$ and is applied to the contrast control circuit 3.

$R_{16}$ represents a variable resistor for brightness control. A voltage obtained at the movable contact of the variable resistor $R_{16}$ is divided by resistors $R_{17}$, $R_{18}$ ... and $R_{21}$ to obtain a brightness control voltage $Vc_{1'}$. The brightness control voltage $Vc_{1'}$ is applied to the brightness control circuit 12. The brightness control circuit 12 functions to decrease the brightness of the reproduced picture with the increase of the brightness control voltage $Vc_{1'}$.

Resistors $R_{22}$ and $R_{23}$ are dividing resistors to be connected to the circuit for obtaining the brightness control voltage $Vc_{1'}$ through a switch $SW_3$ having contacts $a$ and $m$. The switch $SW_3$ is ganged with the switches $SW_1$ and $SW_2$. When the switch $SW_3$ is closed at the contact $a$, a voltage obtained at the connecting point of the resistors $R_{22}$ and $R_{23}$ is applied to the circuit for obtaining the brightness control voltage $Vc_{1'}$. The resistances of the resistors $R_{18}$, $R_{19}$, $R_{20}$, $R_{21}$, $R_{22}$ and $R_{23}$ are determined as 1KΩ, 27KΩ, 56KΩ, 820Ω, 12KΩ and 20KΩ, respectively. The capacitors $C_2$, $C_3$ and $C_4$ function to avoid the rapid response of the control circuit.

When the switch $SW_1$ is closed at the contact $m$, the switches $SW_2$ and $SW_3$ ganged with the switch $SW_1$ also are closed at their contacts $m$. The point A is connected to the ground and resistors $R_7$, $R_8$, $R_{22}$ and $R_{23}$ are put into respectively inactive conditions. Thus, the control circuit is put into the manual control condition. In the manual control condition, the control voltages $Vc_1$ and $Vc_2$ are varied with the manual operation of the variable resistor $R_3$ to adjust the contrast of the reproduced picture and the color saturation thereof to the choices of the users. The color saturation of the reproduced picture and the brightness thereof can be separately adjusted by the variable resistors $R_{12}$ and $R_{16}$, respectively.

When the switch $SW_1$ is closed at the contact a, the switches $SW_2$ and $SW_3$ ganged with the switch $SW_1$ also are closed at their contacts a. The resistors $R_7$, $R_8$, $R_{22}$ and $R_{23}$ are put into respectively active conditions. Thus, the control circuit is put into the automatic control condition. In this condition, even when the movable contact is at one end of the variable resistor $R_3$ nearer to the resistor $R_7$, the control voltages are not fixed, rather a variable voltage can be obtained from the movable contact of the variable resistor $R_3$. Accordingly, the reproduced picture can be automatically controlled in response to the level of the ambient light L. Since the movable contact is at the end of the variable resistor $R_3$ nearer to the resistor $R_7$, the range of this voltage variation obtained at the movable contact is narrow. Also in the automatic control condition, a fine control operation of the reproduced picture can be performed with the adjustment of the variable resistor $R_3$. The resistor $R_8$ functions to avoid a change in the output impedance of the transistor T when the switch $SW_2$ is closed at the contact $a$.

The range of the variation of the voltage obtained from the variable resistor $R_{16}$ for brightness control is narrowed due to the series circuit consisting of the resistors $R_{22}$ and $R_{23}$, and so the brightness control voltage $Vc_{1'}$ does not change greatly. Hence, when the level of the ambient light L becomes lower, an overall whitish appearance of the reproduced picture can be avoided even when the movable contact is at the end of the variable resistor $R_{16}$ nearer to the power supply. In other words, since the maximum brightness of the reproduced picture is lower in the automatic control condition than in the manual control condition, an overall whitish appearance of the reproduced picture can be avoided, even when the variable resistor $R_{16}$ for brightness control is misoperated.

According to this invention, in the automatic reproduced picture control circuit for a color television receiver using a photosensitive device such as CdS photo cell, a control voltage is varied in response to the ambient light level and is applied to the contrast control circuit and the color saturation control circuit to automatically control the reproduced picture. This automatic control voltage can be selectively shunted to ground through switch $SW_1$ to permit manual control of the picture control circuit. A manual brightness control circuit including the variable resistor $R_{16}$ is separately arranged to produce a control voltage $Vc_{1'}$ which is applied to the brightness control circuit. The range of the variation of this control voltage $Vc_{1'}$ is narrowed in the automatic control condition, whereby a well reproduced picture can always be obtained both in the automatic control condition and in the manual control condition even when the picture-control knobs for controlling the reproduced picture are misoperated.

While there have been described preferred embodiments of the invention, obviously modifications and variations are possible in light of the above teachings. It is therefore to be understood that within the scope of the appended claims, the invention may be practised otherwise than as specifically described.

What is claimed is:

1. A picture control circuit for use in a color television receiver comprising power supply means; a first variable resistor having a movable contact; a first resistor connected between said power supply means and said first variable resistor; a variable impedance element connected in series with said variable resistor, said variable impedance element having a control electrode for receiving a control signal to determine the impedance thereof; a photosensitive device coupled to said control electrode of said variable impedance element to supply said impedance determining control signal thereto in response to ambient light; a voltage-controlled contrast control circuit and a voltage-controlled color saturation control circuit operable on the video signal from which said picture is reproduced to thereby adjust the contrast and color saturation of said reproduced picture, said contrast control circuit and said color saturation control circuit being controlled by a control voltage derived from said movable contact of said first variable resistor; a first switch connected in parallel with said variable impedance element having a movable contact and a stationary contact adapted to be selectively closed so as to establish a manual control mode independent of the ambient light condition and to be selectively opened so as to establish an automatic control mode whereby said picture is controlled as a function of said ambient light condition; and a second switch connected in parallel with said first resistor and ganged with said first switch, said second switch having a movable contact and a stationary contact adapted to be opened in an automatic control mode, thereby enabling said control voltage to change in response to the condition of said ambient light in an automatic control mode even if said movable contact of said first variable resistor is at a predetermined extreme position.

2. A picture control circuit according to claim 1, wherein said second switch further comprises a second stationary contact; and further comprising a second resistor connected between said second stationary contact of said second switch and said first variable resistor, such that when said movable contact and said second stationary contact of said second switch are closed when an automatic control mode is established, the effective load impedance of said variable impedance element is not changed.

3. A picture control circuit for use in a color television receiver comprising a first variable resistor having a movable contact; a variable impedance element connected in series with said first variable resistor, said variable impedance element having a control electrode for receiving a control signal to determine the impedance thereof; a photo-sensitive device coupled to said control electrode of said variable impedance element to supply said impedance determining control signal thereto in response to ambient light; a voltage-controlled contrast control circuit and a voltage-controlled color saturation control circuit operable on the video signal from which said picture is reproduced to thereby adjust the contrast and color saturation of said reproduced picture, said contrast control circuit and said color saturation control circuit being controlled by a control voltage derived from said movable contact of said first variable resistor; a first switch connected in parallel with said variable impedance element and adapted to be selectively closed so as to establish a manual control mode for controlling said picture independent of the ambient light condition, said first switch adapted to be selectively opened so as to establish an automatic control mode for controlling said picture as a function of said ambient light condition; a voltage-controlled brightness control circuit operable on said video signal, a second variable resistor having a movable contact for supplying a control voltage to said brightness control circuit, a series circuit of a third resistor and a fourth resistor connected across a power supply, and a third switch connected between said movable contact of said second variable resistor and a junction defined by said third resistor and said fourth resistor, said third switch being ganged with said first switch and having a movable contact adapted to be closed with a first stationary contact in an automatic control for operably connecting said third and fourth resistors to said second variable resistor so as to narrow the range of the control voltage supplied to said brightness control circuit by said movable contact of said second variable resistor.

4. A control circuit for use in a color television receiver for controlling the video picture reproduced from a video signal, comprising:
a first variable resistor having a movable contact;
transistor means having output electrodes connected in series with said first variable resistor, said transistor means having an input control electrode for receiving a control signal to determine the conductivity of said transistor means;
photo-sensitive means coupled to said control electrode of said transistor means and responsive to ambient light to supply a corresponding conductivity-determining control signal thereto;
voltage-controlled contrast control means for receiving said video signal and operable thereon to thereby adjust the contrast of said video picture reproduced from said video signal;
voltage-controlled color saturation control means for receiving said video signal and operable thereon to thereby adjust the color saturation of said video picture reproduced from said video signal;
means for applying control voltages derived from said movable contact of said first variable resistor to said contrast control means and to said color saturation control means to thereby control said contrast and color saturation adjustments, respectively; and
a first switch connected in shunt relation with said output electrodes of said transistor means, said first switch adapted to be selectively opened so as to establish an automatic control mode whereby said video picture is controlled as a function of the ambient light condition, and said first switch adapted to be selectively closed to shunt said transistor means and establish a manual control mode whereby said video picture is controlled independently of said ambient light condition.

5. A control circuit according to claim 4, further comprising a capacitor connected between said input control electrode and one of said output electrodes of said transistor means for determining a time constant to prevent said transistor means from responding to relatively rapid changes in said ambient light.

6. A control circuit according to claim 5, wherein said capacitor is a unipolar capacitor.

7. A control circuit for use in a color television receiver for controlling the video picture reproduced from a video signal, comprising:
a first variable resistor having a movable contact for producing a control signal;
variable impedance means connected in series with said first variable resistor, said variable impedance means having a control terminal for receiving a signal to determine the impedance thereof;
photo-sensitive means coupled to said control terminal of said variable impedance means and responsive to ambient light to supply a corresponding impedance-determining signal thereto;
voltage-controlled contrast control means for receiving said video signal and operable thereon to thereby adjust the contrast of said video picture reproduced from said video signal;
voltage-controlled color saturation control means for receiving said video signal and operable thereon to thereby adjust the color saturation of said video picture reproduced from said video signal;
means coupled to said movable contact of said first variable resistor for receiving said control signal and for deriving first and second control voltages therefrom in a predetermined ratio;
means for applying said first control voltage to said voltage-controlled contrast control means to control said contrast adjustment of said video picture;
means for applying said second control voltage to said voltage-controlled color saturation control means to control said color saturation adjustment of said video picture; and
a switch connected in shunt relation with said variable impedance means and having a movable contact and a stationary contact adapted to be opened so as to establish an automatic control mode whereby said video picture is controlled as a function of the ambient light condition, said movable contact and said stationary contact adapted to be closed to shunt said variable impedance means so as to establish a manual control mode whereby said video picture is controlled independently of said ambient light condition.

8. A control circuit according to claim 7, wherein said switch includes a second stationary contact adapted to be closed with said movable contact when said movable and first stationary contacts are opened; and further comprising an indicating lamp connected between said second stationary contact and a source of voltage, said indicating lamp being energized when said movable and second stationary contacts are closed in an automatic control mode.

* * * * *